E. SAMPLE.
TILTING GATE.
APPLICATION FILED JULY 30, 1908.
913,434.
Patented Feb. 23, 1909.
2 SHEETS—SHEET 1.
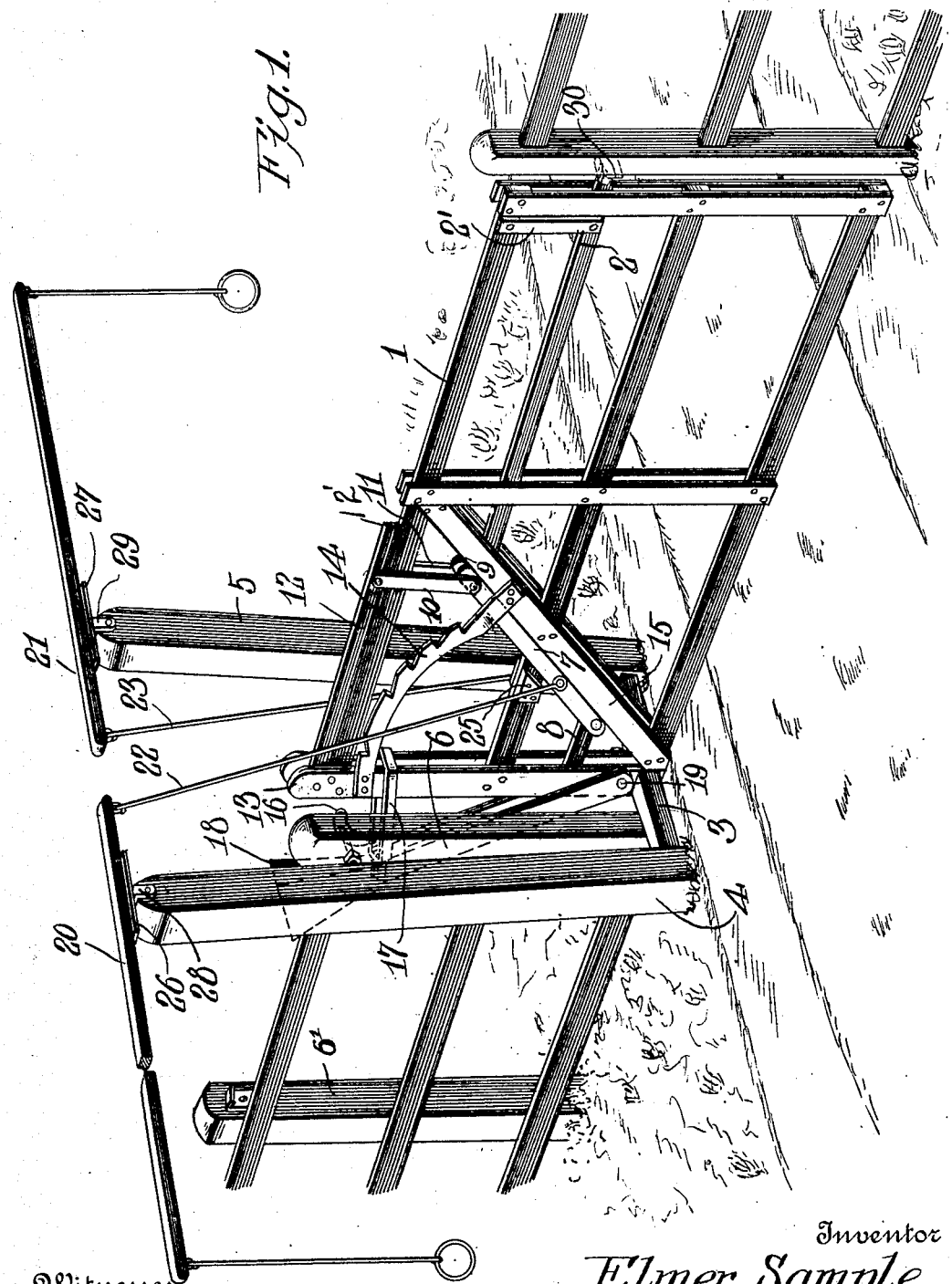
Fig. 1.
Witnesses
C. E. Smith.
C. H. Griesbauer.
Inventor
Elmer Sample
By 
Attorneys

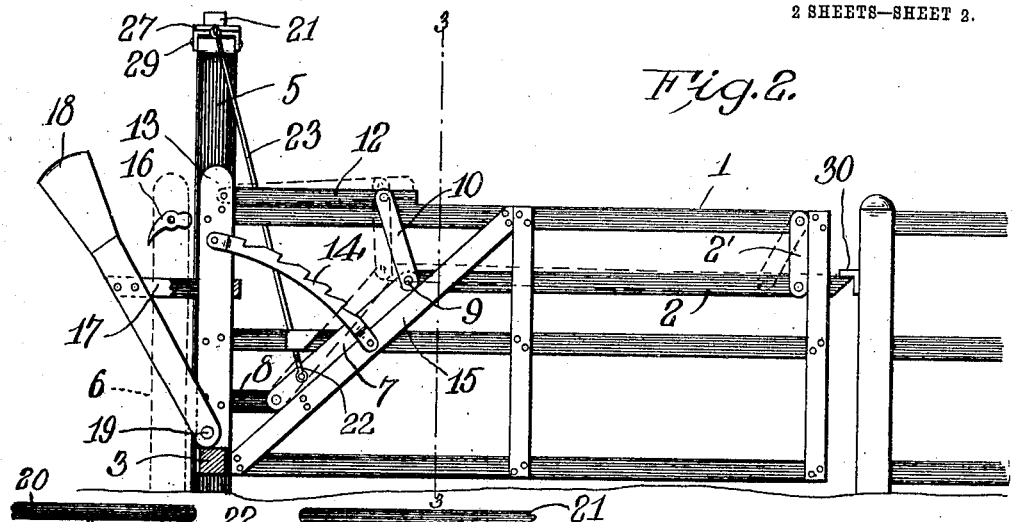

UNITED STATES PATENT OFFICE.

ELMER SAMPLE, OF STEWARTSVILLE, MISSOURI.

TILTING GATE.

No. 913,434.      Specification of Letters Patent.      Patented Feb. 23, 1909.

Application filed July 30, 1908. Serial No. 446,115.

*To all whom it may concern:*

Be it known that I, ELMER SAMPLE, a citizen of the United States, residing at Stewartsville, in the county of Dekalb and State of Missouri, have invented certain new and useful Improvements in Tilting Gates; and I do declare the following to be a full, clear, and exact description of the invention, such as will enable others skilled in the art to which it appertains to make and use the same.

This invention relates to an improved tilting gate, and the object thereof is to provide a gate of this character with means for locking it in either open or closed position and at any intermediate point or angle.

With these and other objects in view, the invention consists of certain novel features of construction, combination and arrangement of parts, as will be more fully described and particularly pointed out in the appended claims.

In the accompanying drawings, Figure 1 is a perspective view of a gate constructed in accordance with this invention; Fig. 2 is a longitudinal section with the gate shown in elevation; Fig. 3 is a vertical section thereof on the line 3—3 of Fig. 2; Fig. 4 is a similar view to Fig. 2 showing a slightly modified form of gate; and Fig. 5 is a perspective view of the post at the back of the gate carrying means for locking it in open position.

In the embodiment illustrated, a gate 1 of ordinary construction is shown having a latch member 2, preferably made in the form of a bar projecting at one end beyond the front end of the gate and beveled to engage the catch of the post, and with its other end pivoted to an operating member to be hereinafter described. The front end of this latch 2 is preferably supported by a link 2' which connects it with the top bar of the gate. The rear end of this gate at its lower corner is mounted on a rocking shaft 3, the ends of which are journaled in two posts 4 and 5, spaced transversely apart. A post 6 is arranged between the posts 4 and 5 for a purpose to be described.

An operating member 7 is pivotally mounted on a short bar 8 of the gate 1, and the front end thereof is connected with the inner end of the latch member 2, preferably by means of a pivot 9, which also connects said member 7 with two spaced links 10 and 11, the upper ends of which are pivotally connected with a bar 12. This bar 12 is pivoted at its rear end to the rear or upright 13 of the gate 1.

A rack bar 14 is secured at one end to the post 13, and at its other end to a diagonally disposed bar 15, arranged on the gate and which serves as a brace therefor. A dog 16 is pivotally mounted on the post 6, and is designed to engage the rack bar 14 when the gate is raised for locking it in adjusted position. A looped strap or collar 17 encircles the post 13 of the gate, and is connected with a weighted member 18, pivotally connected at its lower end with the gate at 19. This member 18 is preferably composed of two laterally spaced bars pivoted at one end to opposite sides of the post 13 at its lower end and between which the post is adapted to swing, the free ends of said bars being connected and weighted. The loop 17 is secured to the inner faces of said bars to form a guide for said post 13.

Two operating levers 20 and 21 are pivotally mounted on the upper ends of the posts 4 and 5, and are so arranged as to bring the front ends thereof toward the front end of the gate in position for convenient operation by a person passing through the gate. The rear ends of these levers 20 and 21 are connected by means of two rods 22 and 23 with the operating member 7 preferably at a point near its lower pivoted end, and when the front end of these pivoted levers 20 or 21 is depressed the bar 7 is raised drawing with it the latch member 2, disengaging the free end of said member from the coöperating element of the gate post. This bar 7 is raised until it comes in contact with a block 25 having its front end beveled to engage said bar 7. On the further depression of either of the levers 20 or 21 the gate is tilted rearwardly and the dog 16 riding over the rack-bar 14 engages with one of the teeth thereof should the lever at any time be accidentally or otherwise released. After the gate reaches a predetermined point the weighted member 18 assists in over-balancing the weight thereof and causes it to rise easily. After the dog 16 drops off of the front end of the bar 14 the gate has reached the point where the weighted member 18 overbalances it, and there is no danger of its dropping forward.

In the embodiment shown in Fig. 4 the gate is constructed similarly to that shown in the other figures, except that the latch member 2 thereof is made double to adapt it for use on a gate constructed of iron piping or tubing.

The levers 20 and 21 are preferably connected to the posts 4 and 5 by means of blocks 26 and 27 mounted on top of said posts by strap irons 28 and 29 secured to the underside of the blocks preferably by bolts, and which extend down on each side of the posts and from long axles which prevent the levers from wabbling. These strap irons 28 and 29 are so arranged to provide for their adjustment to set the levers 20 and 21 at an angle and position their front ends toward the front end of the gate for convenience in use.

After the gate has been raised a sufficient distance to cause the dog 16 to drop off the front end of the rack or ratchet bar 14 the gate continues to rise until the weighted bars or members 18 come in contact with the ground with the rear upright 13 of the gate lying between said bars. In this position the latch member 12 and the member 7 drop back and cause the inner end 12' of the bar or latch member 12 to move into position to engage with the lug 30', on a post 6' disposed back of the gate a distance equal to the height of said gate whereby the gate is locked in open position. To close the gate a pull on one of the levers 20 or 21 will cause the bar 7 to move away from the stop 25, and draws the front end of the latch 12 from under the lug 30', and a continuation of the pull on the lever causes the gate to swing forward and close. On the closing of the gate the weighted bars 18 remain on the ground until the gate is moved a sufficient distance to cause the collar 17 to again engage the upright 13 when the weighted bars 18 begin to rise and causes the gate to move forward easily.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

I claim as my invention.

1. In a tilting gate, the combination of spaced supporting means, a gate having a rocking shaft connected with its lower end and mounted in said supporting means, a latch member carried by said gate, an operating member mounted on one of the gate posts, means pivotally connecting said operating member with the latch member, a rack bar mounted on said gate, and a dog carried by said supporting means for engaging the rack bar to hold the gate in adjusted position.

2. In a tilting gate, the combination of laterally spaced posts, a gate having a rocking shaft at its lower end mounted between said posts, a bar pivotally mounted on said gate near its lower end, a latch pivotally connected with said bar, an operating member pivotally mounted on one of said posts, a rod connecting the inner end of said member with said bar near its pivotal end, and means for locking said gate in partially open position.

3. In a tilting gate, the combination of a supporting means, a gate mounted to swing vertically thereon, longitudinal movable locking means carried by said gate and constructed to lock the gate in either its closed or open position, means for operating said locking means, adapted to be actuated at a point remote from the gate and means for over-balancing the weight of the gate when it reaches a predetermined point.

4. In a tilting gate, the combination of a supporting structure, a gate pivotally mounted at its lower end on said structure and adapted to swing vertically, a bar pivotally connected at one end with the lower end of said gate and having its free end weighted and a loop fixed to said bar and encircling the rear upright of said gate and means for locking said gate at various points in partial position.

5. In a tilting gate, the combination of spaced supporting means, a gate having a rocking shaft connected with its lower end and mounted in said supporting means, bars pivotally connected at one end to the opposite sides of the lower end of said gate and provided with a weight at their free ends, a loop connected with said bars and encircling the rear end of said gate to form a guide therefor, a rack bar carried by the gate, a dog carried by said supporting means for engaging the rack bar to hold the gate in an adjusted position, a longitudinal slidable latch member, an operating member for said latch operable at a remote distance from the gate and means pivotally connecting said operating member with the latch member.

In testimony whereof I have hereunto set my hand in presence of two subscribing witnesses.

ELMER SAMPLE.

Witnesses:
 EVA STIGALL,
 C. J. KING.